US008135809B2

(12) United States Patent  
Hehmeyer et al.

(10) Patent No.: US 8,135,809 B2  
(45) Date of Patent: Mar. 13, 2012

(54) PRESENCE CAPABILITIES AND PREFERENCES

(75) Inventors: Alexander M. Hehmeyer, Bellevue, WA (US); Setty Venkateshaiah, Bothell, WA (US); Amit Gupta, Redmond, WA (US); Avronil Bhattacharjee, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 146 days.

(21) Appl. No.: 12/356,550

(22) Filed: Jan. 21, 2009

(65) Prior Publication Data

US 2010/0185770 A1   Jul. 22, 2010

(51) Int. Cl.  
*G06F 15/177* (2006.01)

(52) U.S. Cl. .................... 709/220; 709/221; 709/227

(58) Field of Classification Search .............. 709/220, 709/221, 227  
See application file for complete search history.

(56) References Cited

U.S. PATENT DOCUMENTS

| | | | |
|---|---|---|---|
| 7,154,409 B2 | 12/2006 | Mohammed et al. | |
| 7,337,405 B2 * | 2/2008 | Weng et al. | 715/748 |
| 7,359,496 B2 | 4/2008 | Qian et al. | |
| 2005/0135240 A1 | 6/2005 | Ozugur | |
| 2006/0095560 A1 | 5/2006 | Wu et al. | |
| 2006/0190591 A1 | 8/2006 | Bobde et al. | |
| 2007/0078986 A1 * | 4/2007 | Ethier et al. | 709/227 |
| 2008/0031225 A1 | 2/2008 | Chavda et al. | |
| 2008/0205625 A1 | 8/2008 | Mandalia et al. | |

OTHER PUBLICATIONS

"Indigo Presence Server & SDKTM", Retrieved at <<http://www.indigosw.com/pdf/presence_server.pdf>>, Indigo Software.  
Sedlar, et al., "Using Aggregated Presence Information in an Enterprise Environment", Retrieved at <<https://www.icin.biz/files/programmes/Poster-7.pdf>>.  
Eslami, Mohammad Zarifi, "A Presence Server for Context-aware Applications", Retrieved at <<http://web.it.kth.se/~maguire/DEGREE-PROJECT-REPORTS/071220-Mohammad_Zarifi_Eslami-with-cover.pdf>>, Dec. 17, 2007.

* cited by examiner

*Primary Examiner* — Adnan Mirza (57) ABSTRACT

Architecture for gathering and presentation to a remote user (watcher) of presence, preferences, and capabilities information of a local user (publisher). An extensible presence document is employed, as transmitted by the publisher, that contains specific information about the capabilities of the publisher endpoint and preferences that are for the publisher overall. The document is aggregated, and the aggregated capabilities are transmitted to watchers. The watchers render this information in a user experience.

20 Claims, 11 Drawing Sheets

PRESENCE CAPABILITIES AND PREFERENCES

BACKGROUND

Technological advances in communications systems have provided the capability to connect to other users through a variety of modalities. For example, phone calls can be made using the standard wireline phone, cellular phones, or IP phones over the Internet. Moreover, the call can be made using mobile clients that operate on different devices such as desktop computers, laptops, PDAs, etc. Additionally, communications can be by voice, video, both voice and video, text messaging, etc. The communications capabilities can range from the latest device hardware and software, to legacy hardware and software, to no capabilities at all.

Thus, when deciding to communicate with a user it can be problematic to connect in a way that meets the requirements of the both users, the location, the time of day, and so on. For example, when placing an audio or video call, it is difficult to know if the remote party has audio/video capabilities on the connection device before placing the call. If the remote party does not have a webcam installed, then video capabilities cannot be performed.

In another example, it would be beneficial to know whether or not a user has logged on to an endpoint that has audio and/or video capability, or is willing to accept an audio and/or video call. For example, placing a voice call to a user that does not have voice call capability would waste time and cause frustration. Knowing by some indication that the recipient instead has instant messaging capability saves time and provides a more positive user experience. However, existing systems lack these rich capabilities thereby negatively impacting the user experience and usability.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture facilitates the presentation of information to a remote user of the communications, collaboration, and/or environmental capabilities and preferences of a local user (publisher). For example, information that the local user has an audio communications device and video camera can now be known before a call is placed. Additionally, the information can include hardware and/or software capabilities related to collaboration with other users. The environmental capabilities include environment information such as the availability of hardware devices and peripherals (e.g., video/audio conferencing systems, telephone, whiteboard, etc.) in the vicinity of the user (e.g., a conference room, office area, etc.).

An indicator (e.g., icon) next to the local user name in a user interface that shows a microphone or video camera can provide this feedback to the remote user (or other users of a multi-user communications session) such that the remote user can participate based on this now known information.

An extensible presence document is employed, as transmitted by the publisher, that contains specific information about the capabilities of the publisher endpoint and preferences that are for the publisher overall. The document is aggregated, and the aggregated capabilities are transmitted to watchers (e.g., remote users). The watchers render this information in a user experience.

In a large company, for example, being able to see this information through a software client makes users feel more confident when placing audio/video calls (e.g., VoIP or PSTN) through the software. This provides a motivation to use the software product, as well as improving employee efficiency and communications effectiveness.

The information can also include presence indication by providing device/endpoint capability presence that displays if a user is logged on to an endpoint that has audio and/or video capability, for example, or is willing to accept an audio and/or video call. Alternatively, there can be situations where a local user would not prefer to receive a voice and/or video call, but could accept an instant messaging conversation such as when in a meeting or if the local user is busy. Thus, the architecture allows the local user to select a simple presence state to indicate to the remote user that a voice call and/or a video call are not acceptable. Hence, users trying to make voice contact can be forwarded directly to voicemail. This can include presenting information that the local user does not have voice and/or certain capabilities (e.g., a mix between manual and automatic settings as the user may have audio capabilities, but may not have microphone/speaker systems).

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

The disclosed architecture gathers and presents to a remote user (the watcher) the presence, preferences, and hardware/ software capabilities information of a local user (the publisher) or local system. An extensible presence document is employed in which the presence, preferences, and hardware/software capabilities information is stored and transmitted by the publisher for presentation to the watcher or different watchers.

This information can be uploaded and stored on a communications server such that users that are publishers and users that are watchers can receive this information at any time. Moreover, any changes in the state of the user (publisher or watcher) can be dynamically uploaded to the server so that other users can quickly obtain the change in state.

In the context of a presence implementation, a presence document can be XML (extensible markup language) structured data utilized to provide presence data. The presence document can provide data about user state, for example, availability, device capabilities, physical location, device identifier for the device used, current activity of the user, user calendar information for the day, etc. This data is entered into the presence document and is sent to subscribers allowed to receive the document. Privacy controls are in place that can restrict how watchers view user information.

Updates to user state are pushed immediately to the server such that watchers can receive the changes in state in near realtime. For example, the fact that the publisher state changed to making a phone call triggers publication of the state change to all watchers. In another example, the change in state of a device that cannot perform instant messaging can indicate to a watcher to not bother sending an instant message because it will fail. In other words, state changes are continually being passed to watchers so that the watchers can decide how and when to interrupt the publisher.

Capabilities computation includes whether the publisher device includes hardware/software capability, as well as other aspects of the publisher state. For example, if the publisher is driving in a car that and unable to do instant messaging but a voice call would be acceptable, this information can be readily entered into the presence document and uploaded for updating all watchers. In another example, when in a noisy environment such as a subway station voice communications may not be viable whereas instant messaging would be. Similarly, in a meeting with multiple attendees the publisher can indicate to use instant messaging but not voice calls.

The capabilities computed can be related to software as well. For example, some software may not support video. Thus, this incapability is communicated in the presence document to watchers who will fail to connect using video as a medium.

Tracking the user state provides the ability to adapt modalities to changing environments of the publisher such as in a meeting, in a noisy environment, etc. Tracking can occur automatically or the user can opt-in, for example. Tracking can be based on normal user routines such as typically being at home before 9 AM each day, in the work location by 9 AM each morning, near a phone, desktop computer, etc., in the corporate lunchroom at about 12:30 PM each day, and so on.

In a more robust implementation, the architecture is based on a model that allows the user to fine tune the user preferences in ways that are light-weight. The user can configure preferences one time and thereafter not have to adjust for each situation; the user can tell everyone the right way to communicate to the user. This can be on a per device case, as well. Moreover, the publisher can prioritize the watchers and the type of capabilities the watchers can access, etc. For example, the supervisor of the publisher will be allowed through using any modality, while a call by the publisher's spouse, for example, may be prevented based on the environment, situation, location, etc. In other words, the publisher preferences are different for the supervisor than for the spouse.

Presence states such as voice-only can indicate that the publisher can only be reached by voice call, and not instant messaging. Another state can be "do not disturb—no instant messaging" (a negative phrasing), which can imply that if the publisher has to be interrupted, use phone calls, or some means other than instant messaging. This is in contrast to positive phrasing such as "available—voice only". In other words, when the publisher is a busy state, the presence information wording is presented in a negative phraseology. When the publisher is busy, watchers are presented with the things the watchers should not do, and the publisher is not busy watchers are informed about the things that can be done invite the communication.

In one implementation of a presence framework, presence modalities data can be stored on a server database as categories. There can be a fixed set of categories or a variable set. An XML schema can be provided for each category. Each category includes one or more instances such as a single user endpoint, for example. Each category can be XML structured data on the server that conforms to the category schema. The combined set of all XML data across all categories and instances is referred to as a presence document. The server logic inputs this information into the database and protects the privacy of the information.

The category/instance(s) are stored within containers for publication. Each container has a membership list, which is a set of users that can read the container contents (e.g., the category and instance(s)). Privacy is controlled by filtering some of the XML data put inside the category/instance(s) for a given container. Each container includes some data for each category. A copy of the presence document is inserted into each container based on privacy permissions. In other words, some users can see capabilities information and other users are not allowed to see some of the information (e.g., a voice-only device) because it may be too much data to expose to the general public, for example, for possible exploitation reasons or privacy reasons. The server manages the permissions so that a watcher accessing the server for the user's presence data gets the data from the right container. A watcher cannot obtain the data from a container without the proper permissions.

In one implementation, a copy of the presence document will omit ("blank out") this information and the other copies continue to include it. In this case, the document versions (e.g., minus deletions, in some cases) are put into each container by the client based on the client computations.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
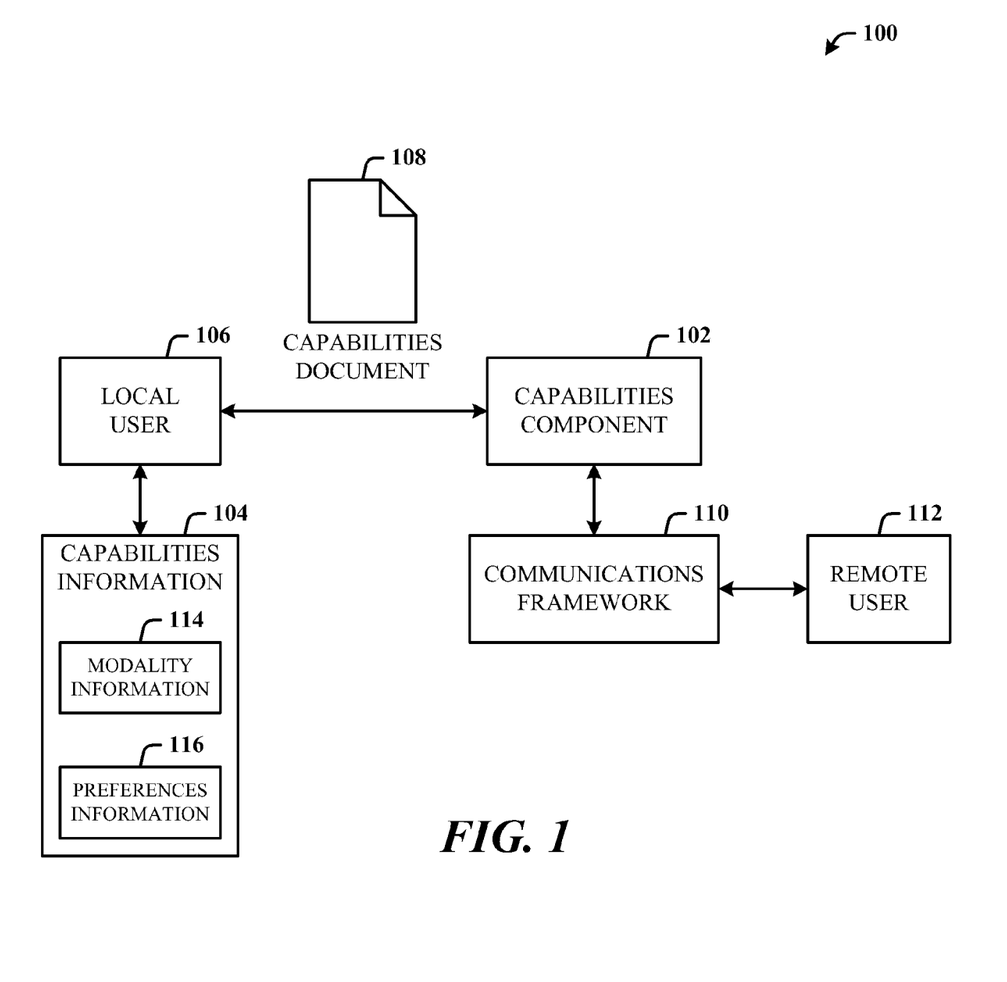
FIG. 1 illustrates a computer-implemented capabilities communication system in accordance with the disclosed architecture.

FIG. 1 illustrates a computer-implemented capabilities communication system 100 in accordance with the disclosed architecture. The system 100 includes a capabilities component 102 for aggregating capabilities information 104 associated with a local user 106 as part of a capabilities document 108, and a communications framework 110 for communicating the capabilities document 108 to a remote user 112 and establishing a session (e.g., communications, collaboration)

between the local user 106 and the remote user 112 based on modality information 114 included in the capabilities document 108.

The capabilities document 108 can be a presence document and the communications framework 110 can be a presence framework. The capabilities information 104 includes hardware capabilities and software capabilities related to communications modalities, such as voice, audio, text messaging, collaboration modalities such as application sharing, and file sharing, for example. The capabilities information can also include hardware and/or software environment information related to the availability of hardware devices and peripherals (e.g., video/audio conferencing systems, telephone, whiteboard, network wireline/wireless, etc.) in the vicinity of the user (e.g., a conference room, office area, etc.).

The capabilities document 108 also conveys preferences information 116 as part of the capabilities information 104 related to user preferences for communicating to the remote user 112 using one or more of the modalities. The capabilities component 102 automatically computes at least one of hardware capabilities or software capabilities based on a device manifest associated with a device of the local user 106.

The capabilities component 102 dynamically computes spatial information (e.g., geographic) and temporal information associated with the local user. The capabilities document 108 includes preferences information of the local user 106 for employing one or more preferred communications modalities for the session, collaboration modalities, and/or environment modalities. The preferred modalities can be obtained by applying the preferences information 116 to the modality information 114. In other words, the remote user will be presented with the modalities that the local user 106 desires to use to communicate with the remote user 112. For example, if the local user is standing in a noisy environment, the preferred mode of communications can be using text messaging.

This preferred modality is then communicated to the remote user 112. If the local user then board a bus, the preferred modality can dynamically change to voice (e.g., phone call). Thus, the remote user 112 can then see this change, stop text messaging, and then call the local user 106, optionally, and continue text messaging while on the call, if allowed by the local user 106. The preferences information 116 can be based on at least one of scheduling data (e.g., calendar data), location of the local user (e.g., office, home, travel, etc.), or identity (e.g., login, permissions) of the remote user 112.

Figure 2:
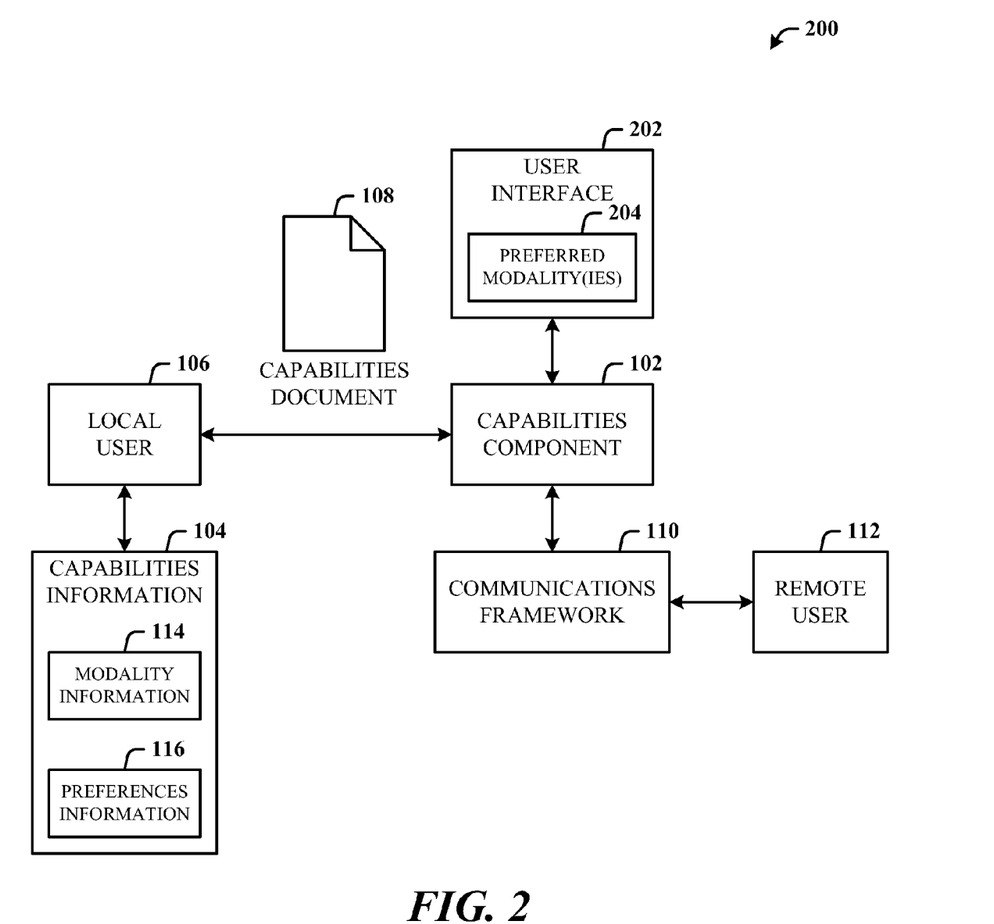
FIG. 2 illustrates an alternative embodiment of a capabilities communication system.

FIG. 2 illustrates an alternative embodiment of a capabilities communication system 200. The system 200 includes the system 100 of FIG. 1, and further comprises a user interface 202 for rendering all or portions of the capabilities information 104 to the remote user 112. The user interface 202 can render different sets (or mixes) of the preferred modality(ies) 204 based on at least one of the scheduling data of the local user 106, the location of the local user 106, or the identity of the remote user 112.

With respect to capabilities computation, the capabilities component 102 can compute the capabilities information 104 based on a device manifest. The device manifest can be an XML (extensible markup language) document that specifies the capabilities for a particular user device or software-based endpoint. Additionally, dynamic factors such as whether the user is driving a car or sitting at a desk can be dynamically determined.

As previously indicated, a user (the local user 106 or the remote user 112) can specify one or more preferred modality(ies) 204 based on various criteria, which include, but are not limited to, the following: geographical location (e.g., physical location) such that different preferences can be published; calendar state, if the local user (publisher) is in a meeting versus not in a meeting, different preferences can be published; and, identity of the remote user (watcher), depending on the access level of the remote user, the stated preference can be different. Thus, the capabilities component 102 provides dynamic preferences tracking based on the spatial information and temporal information.

As previously indicated the user interface 202 facilitates rendering of the capabilities information 104, in whole or in part, as positive and/or negative renderings. For example, the remote user 112 renders the capability as positive when the local user 106 can communicate using a specific modality and negative when the local user 106 cannot be communicated using a specific modality. For example, if the local user 106 indicated to the remote user 112 instant messaging cannot be utilized, either because the device lacks the hardware and/or software capability or the user prefer not to use that modality at the time, this can be rendered as "Voice Only" when the local user 106 and remote user 112 are available, but as "No IM" if the users are busy or otherwise unavailable.

Figure 3:
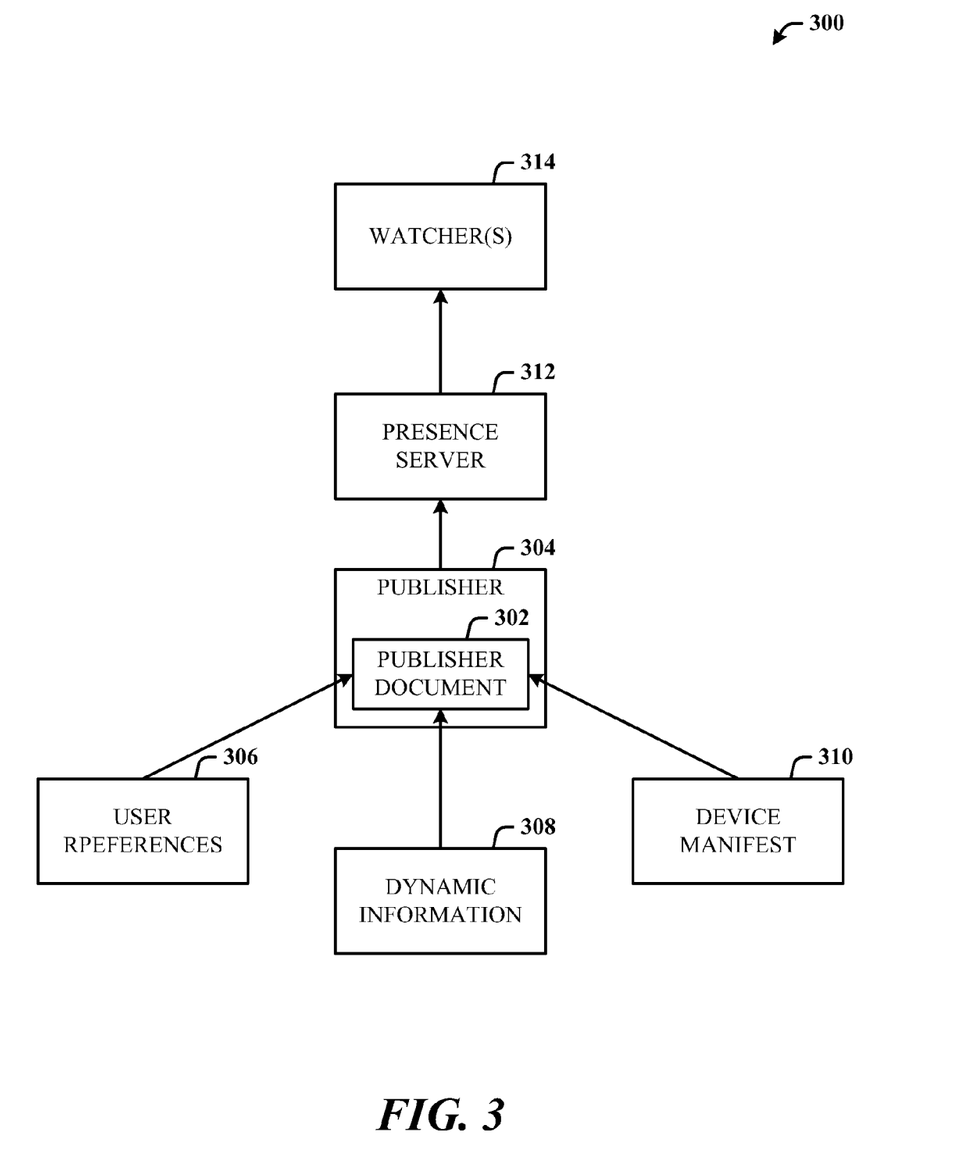
FIG. 3 illustrates a general presence system for publishing presence modality capabilities to watchers.

FIG. 3 illustrates a general presence system 300 for publishing presence modality capabilities to watchers. The system 300 includes a publisher document 302 of a publisher 304 into which pieces of information are written. The capabilities information written into the presence document 302 can include user preferences 306, dynamic information 308, and device capabilities via a device manifest 310. The publisher document 302 and contents are passed (e.g., pushed) to a presence server 312 and watcher(s) 314. The user preferences 306 can include not only the type of communications modality, but the time for using such preferred modalities, the location (e.g., home, work, vehicle, etc.) at which modalities are to be utilized, the environments (e.g., noisy, busy, meeting, etc.) in which the publisher uses the publisher device, and so on.

The dynamic information 308 can include the location of the publisher, in that, as the publisher changes location, the change information is dynamically updated in the presence document and passed to watchers. The device manifest 310 can include not only hardware information, which then defines hardware capabilities, but also software information, that defines software capabilities. For example, the hardware capabilities alone may not be determinative of the software capabilities. Legacy software may be prohibitive of the ability to utilize one or more of the communications modalities.

It is within contemplation of the disclosed architecture that negotiation can occur between the publisher and a watcher. In other words, even though the publisher publishes the "requirements" for communications with the publisher, if the watcher device is not capable of meeting one or more of the requirements the publisher can be notified of the disparity such that the publisher can decide to provide allowances for one or more of the watchers. For example, if the supervisor of the publisher is on travel and lacks the preferred modality for the publisher, the fact that the watcher is a supervisor and is only able to call can override a preference of the publisher for all other watchers to use, for example, instant messaging. This can be made known to the publisher via a notice or alert that the supervisor watcher is incapable at this time of using instant messaging.

This can also be handled by the publisher indicating in the presence document as a preference that the supervisor watcher can use any modality available at the specified time of the communications session. This can also be handled by corporate polices (or rules), for example, that are processed as part of the presence framework, and that can override publisher polices for specific users. In other words, as obtained from the supervisor calendar, when on travel, the corporate policy is to allow all supervisors to connect using a voice call modality. This can also be accomplished on a per user basis.

Still further, in that most if not all presence users will express preferences in associated presence modality capabilities the supervisor preferences can be compared with the publisher (subordinate) preferences, and specific supervisor preferences can override all or certain publisher preferences such that the supervisor preferences are allowed to be utilized at the specific time or location, for example. In general, the ability to now consider user preferences, hardware/software capabilities, and dynamic information provides a wide variety of filtering, negotiation, and override capabilities, for example, now that this information is available for processing.

Figure 4:
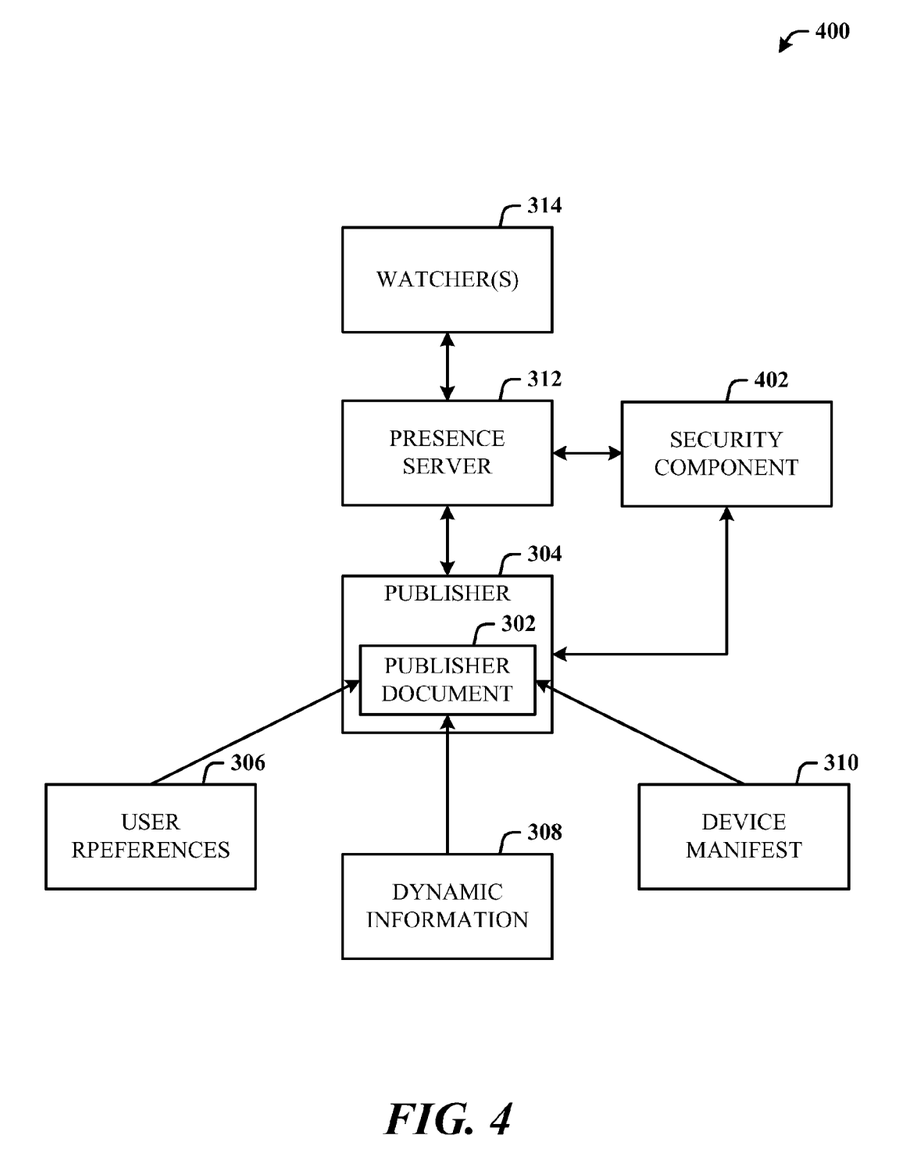
FIG. 4 illustrates a system that further employs a security component for authorized and secure handling of user information (e.g. presence or otherwise).

FIG. 4 illustrates a system 400 that further employs a security component 402 for authorized and secure handling of user information (e.g. presence or otherwise). The security component 402 allows the subscriber to opt-in and opt-out of tracking information as well as personal information that may have been obtained at signup and utilized thereafter. The subscriber (e.g., publisher, watcher) can be provided with notice of the collection of personal information, for example, and the opportunity to provide or deny consent to do so. Consent can take several forms. Opt-in consent imposes on the subscriber to take an affirmative action before the data is collected. Alternatively, opt-out consent imposes on the subscriber to take an affirmative action to prevent the collection of data before that data is collected. This is similar to implied consent in that by doing nothing, the subscriber allows the data collection after having been adequately informed.

The security component 402 also allows the subscriber to access and update profile information, as well. For example, the subscriber can view the personal and/or tracking data that has been collected, and provide corrections. Where sensitive personal information such as health and financial information can be tracked and obtained during subscription or thereafter, the security component 402 ensures that the data is housed using security measures appropriate for the sensitivity of the data. Moreover, vendor access to such information can be restricted using the security component 402 for access only to authorized viewers.

The security component 402 ensures the proper collection, storage, and access to the subscriber information while allowing for the dynamic selection and presentation of the content, features, and/or services that assist the inactive subscriber to obtain the benefits of a richer user experience and to access to more relevant information.

More specifically, as instituted in one or more of the systems described above, a user can indicate that instant messaging is not possible on this endpoint. In one embodiment, an associated modality icon can be grayed in the UI to indicate this. Other indications can include that instant messaging may be "slow" for this user. Accordingly, escalation into a more efficient modality (e.g., audio) may be provided. Using a more specific indication, if the user is oftentimes idle for a specific period of time (e.g., three hours) or for a duration of time, UI indicates can be provided that indicate this (e.g., a partial icon or half-moon state). Other indicators can be provided that represent that the user will be idle frequently, plus there is no audio/video. Additionally, a user can receive calls on a web-access interface and redirect the calls a user cell phone or other endpoint.

A software client can default to dialing a phone number rather than using VoIP) to avoid a bad user experience. In a multi-party session such as a conference, participant capabilities can be exposed according to the permissions and preferences, for example. With respect to user preferences, a user client publishes the preferences per modality and for each endpoint using standard protocols (e.g., presence information data format (PIDF/RFC 3863) where a real number from 0 (least preferred) to 1 (most preferred) indicates communications according to a relative priority of one contact address over another).

The architecture can provide a degree of availability per device, in other words, how "available" is the user when using a particular device. Capabilities of a device can be ranked based on the hardware/software capabilities and user preferences when using the device. For example, although the user cell phone may have all the capabilities for audio modality, the speaker/microphone system of the particular phone device may be marginal and of poor quality. Thus, for audio capabilities, the user preference can be to not utilize this modality for this particular device, but use instant messaging.

With respect to capabilities or lack of capabilities for instant messaging, a user having an endpoint that cannot engage in instant messaging, when a watcher tries to instant message, the watcher receives an indication that the user cannot be reached by instant messaging. If the publisher device capability is mobile, for example, but a watcher sees indications that the publisher presence is "Available—Mobile", watchers gain a sense that the publisher may be away from the office, possibly driving, and that instant messaging may be or may not be the best way to reach the publisher. Where the device capability does not include voice capability, the publisher can receive indication that the watcher cannot be reached by voice.

In another example, the publisher is logged into a web-access session interface. A watcher calls the publisher, but the publisher is only logged into the web access interface. The watcher receives feedback before the call and during the call that the publisher cannot receive voice calls. The publisher can reroute the incoming call. The watcher can choose a different, suggested modality, as indicated in the publisher presence document.

A publisher hooks a webcam up to a desktop computer. Without any further action from the publisher, the watchers can see that the publisher is now video capable. Similarly, based on the presence modality capabilities, a user starting a voice call with a watcher can see a video component cannot be added to the call, the watcher endpoint does not support video. As previously indicated all users, watchers and publishers can benefit from published preferences and capabilities information.

In an offline example, a watcher tries to call the publisher, but the publisher cannot be reached by voice in realtime. The watcher has the option of switching to an asynchronous modality (e.g., voicemail) or to a realtime modality that the publisher is capable of handling.

The architecture is extensible in that a customer wants capabilities that were not anticipated. Extensibility allows the addition of one or more dimensions based on the modalities, devices, and/or user preferences. In a language example, a user calls a support center that uses a different language. The system can automatically route the call to an operator who speaks the same language that caller uses. With respect to device capability, a user in a conference room that supports high definition video and has a "high-def" video camera setup to broadcast this meeting remotely, a user connects to the conference on a device that cannot display high-def video. The system can automatically send the user endpoint the low-def version of the conference video.

Other preference or capabilities can be obtained from user configuration information. For example, if the user is visually impaired or hearing impaired, the modality can be selected based on parameters set in other device program settings and/or according to user preferences.

Figure 5:
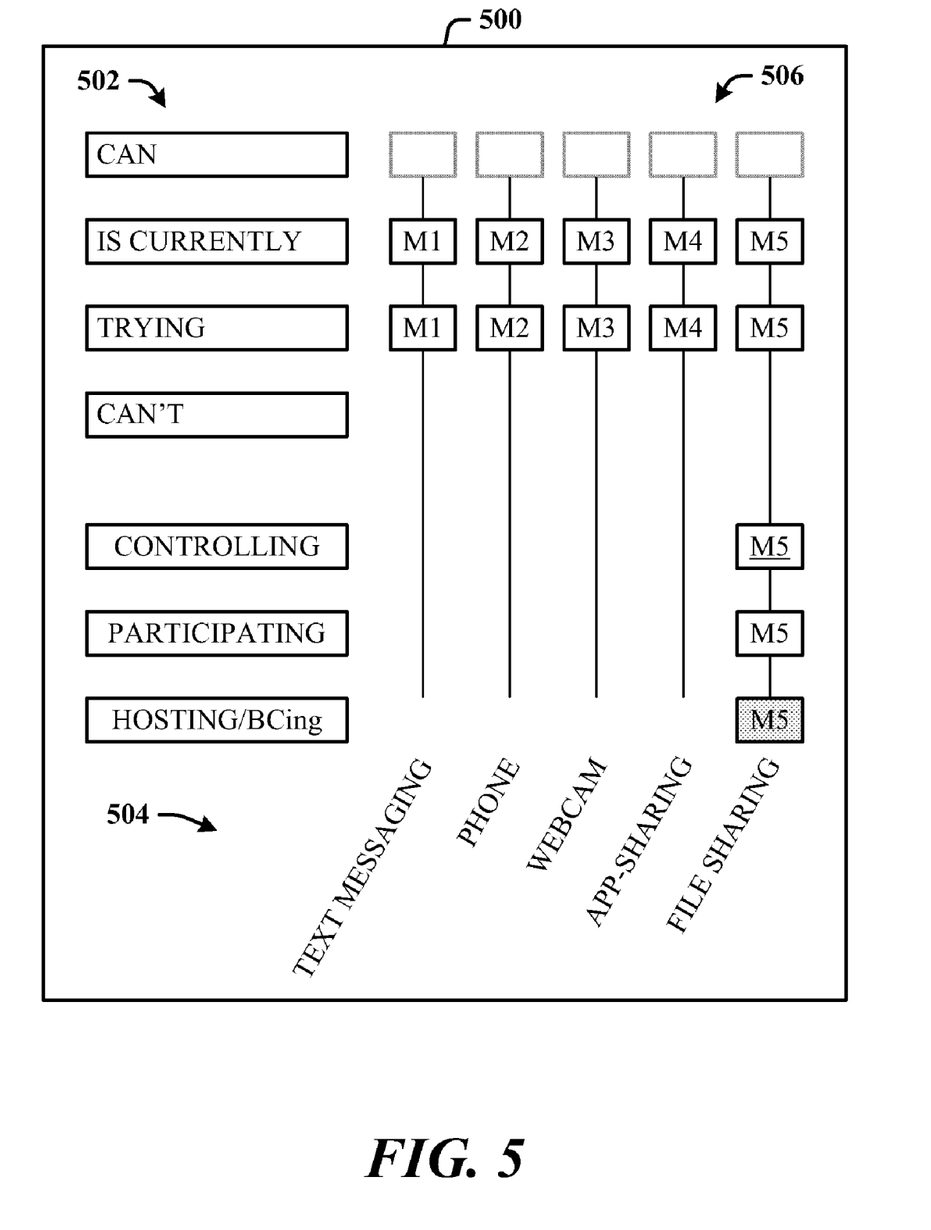
FIG. 5 illustrates an implementation of a user interface that indicates modality capabilities and state information.

FIG. 5 illustrates an implementation of a user interface 500 that indicates modality capabilities and state information 502. For example, the capabilities include "Can" for available modalities, "Is currently" for current modality use, "Trying" for attempting to use a specific modality, and "Can't" for an inability to use a modality. Additionally, the UI 500 includes state information as to if the associated user is a controlling entity ("Controlling") for the communication session, a participant ("Participating"), or is hosting or broadcasting ("Hosting/BCing"). The state information is provided on a per modality basis. For example, five modalities 504 are provided: modality M1 (text messaging), modality M2 (voice communications), modality M3 (video communications via a webcam), modality M4 (application sharing), and modality M5 (file sharing). The modality capabilities are provided as indicators 506. If a modality indicator 506 (e.g., M3) is grayed out (less pronounced), the user cannot perform related to that modality, or the user prefers not to communicate using that modality.

Figure 6:
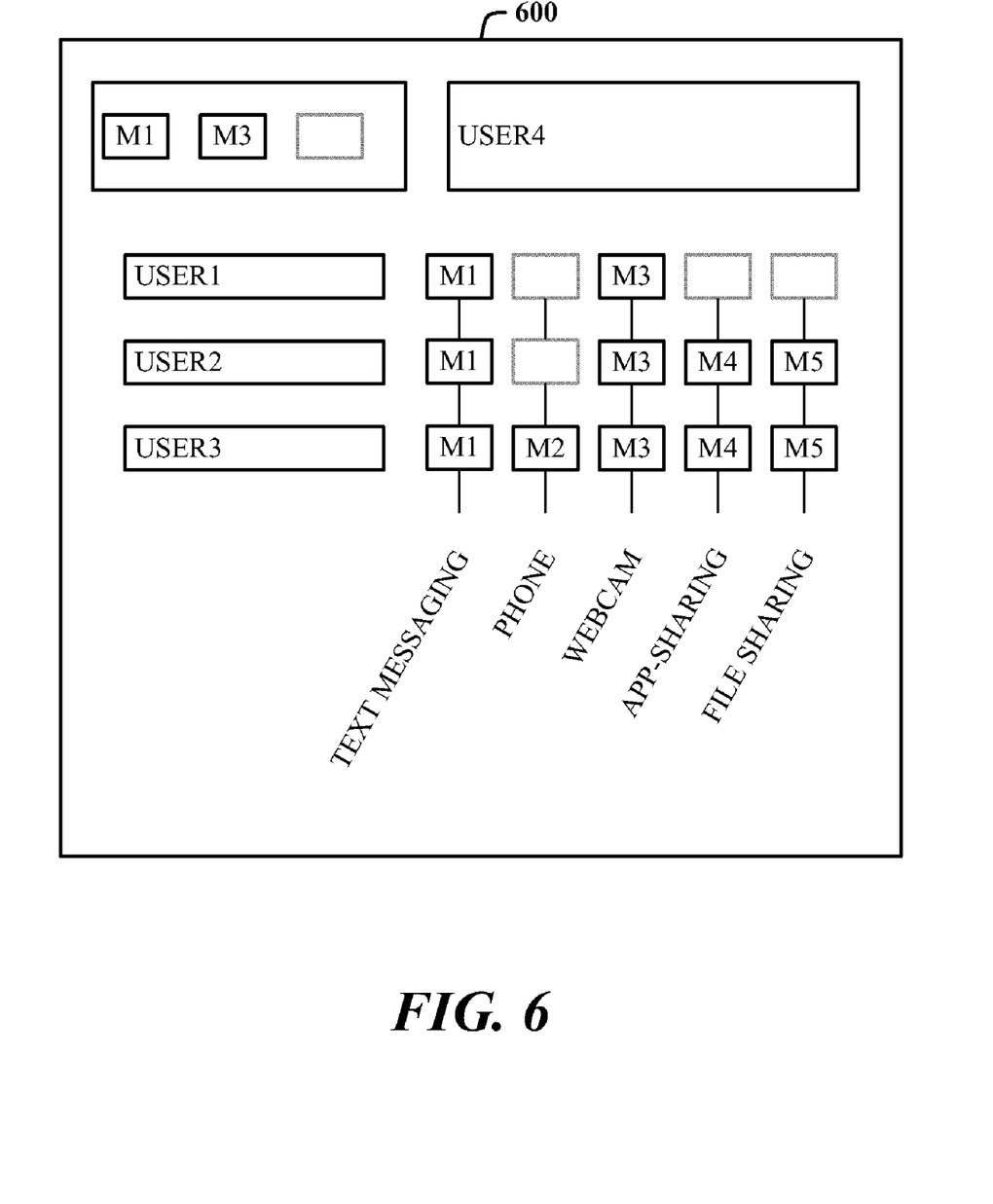
FIG. 6 illustrates an example presence user interface.

FIG. 6 illustrates an example presence UI 600. The UI 600 shows that three watcher users, User1, User2, and User3 are in communication with a publisher User 4. The UI 600 indicates that all three users and the publisher User4 share common modalities M1 and M3, which can be the text messaging and webcam, as means for communication.

A modality, as used herein, represents a means or a form of communication that can be enabled/disabled independently of all other means of communication. Therefore, there is no dependency between modalities. For example, a form of communications can be by a collaboration modality. To allow for dependencies other modalities not shown, the schema can be extended by allowing "sub-modalities." The modalities include device information (knowing which device that a user is most active on can imply a set of capabilities that would otherwise be difficult to communicate). For example, "mobile" comes with a host of possibilities which are easily communicated by simply saying "mobile." Availability per modality implies both ability and willingness for a user to communicate on that modality. Ability per offline modality implies the ability for a user to receive offline versions of a given modality. Note that only ability is required here (not availability which is both ability and willingness) as an offline modality is not interruption-based and therefore does not require consent. Preferences are per user and define how the entity wishes to be communicated with.

Note that the distinction between the "willingness" component of availability per modality and the user preferences is merely that the "willingness" is more dynamic and automatic, whereas preferences are either fairly static and are manually set. In addition, preferences also contain information about how to utilize a given modality, whereas availability implies whether the modality is usable. Finally, preferences are set per user. Thus, preferences can apply across all devices and at all times, even if all endpoints are logged out.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 7:
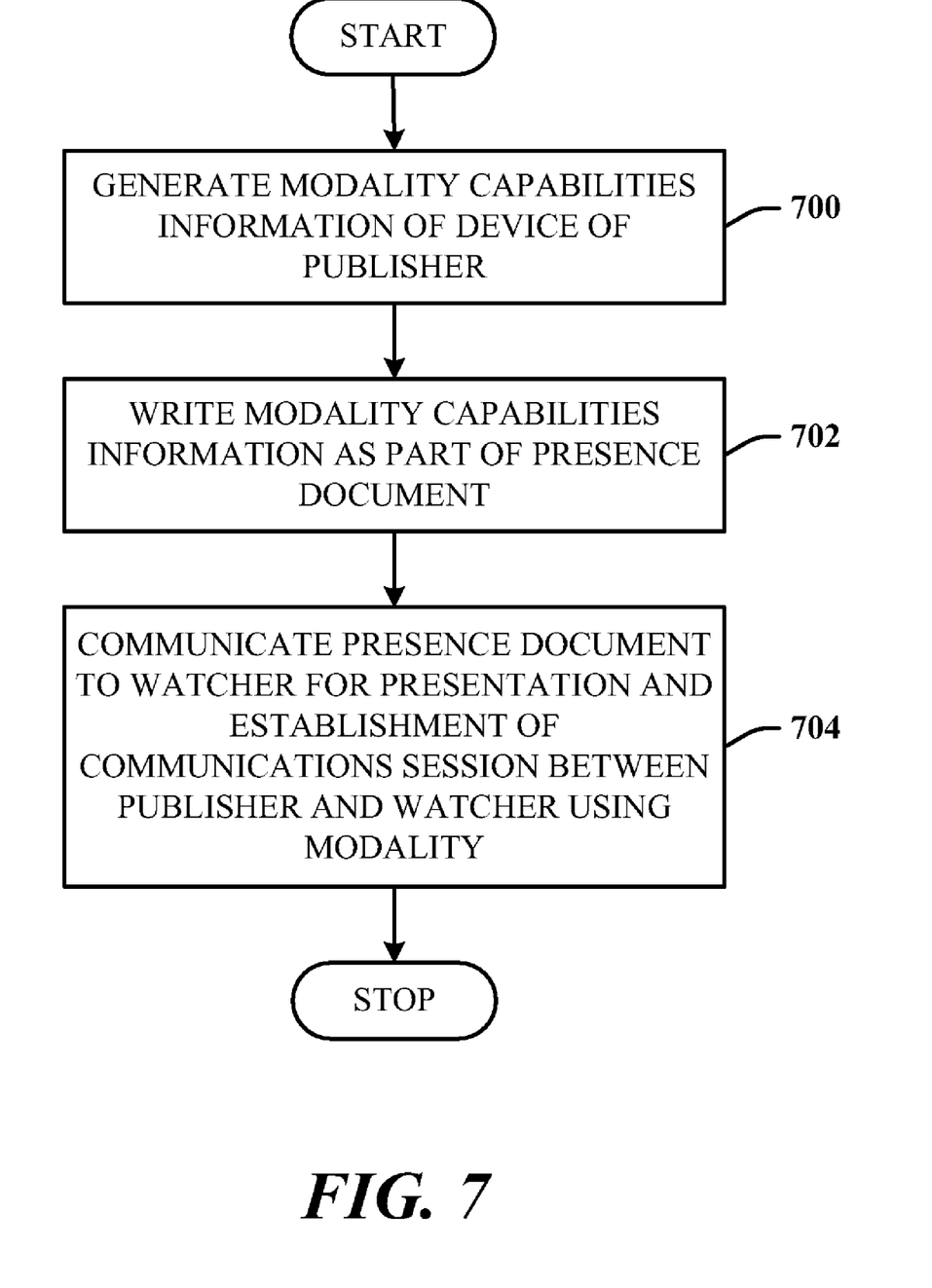
FIG. 7 illustrates a method of communicating capabilities.

FIG. 7 illustrates a method of communicating capabilities. At 700, modality capabilities information of a device of a publisher is generated. At 702, the modality capabilities information is written as part of a presence document. At 704, the presence document is communicated to a watcher for presentation and establishment of a session between the publisher and the watcher using a modality.

The method can further comprise dynamically updating the modality capabilities information based on changes in state of the publisher, and sending the updated modality capabilities information in an updated presence document to the watcher. The method can further comprise including preferences information of the publisher in the modality capabilities information as to one or more modalities to be utilized from communications during the session.

The method can further comprise stipulating the one or more modalities as a preference based on at least one of physical location of the publisher, scheduling state of the publisher, or identity of the watcher, and rendering a negative indication when the publisher cannot be communicated to. The method can further comprise stipulating a modality preference based on location of the publisher, and imposing a different set of preferences based on a changed in the modality capabilities information.

Figure 8:
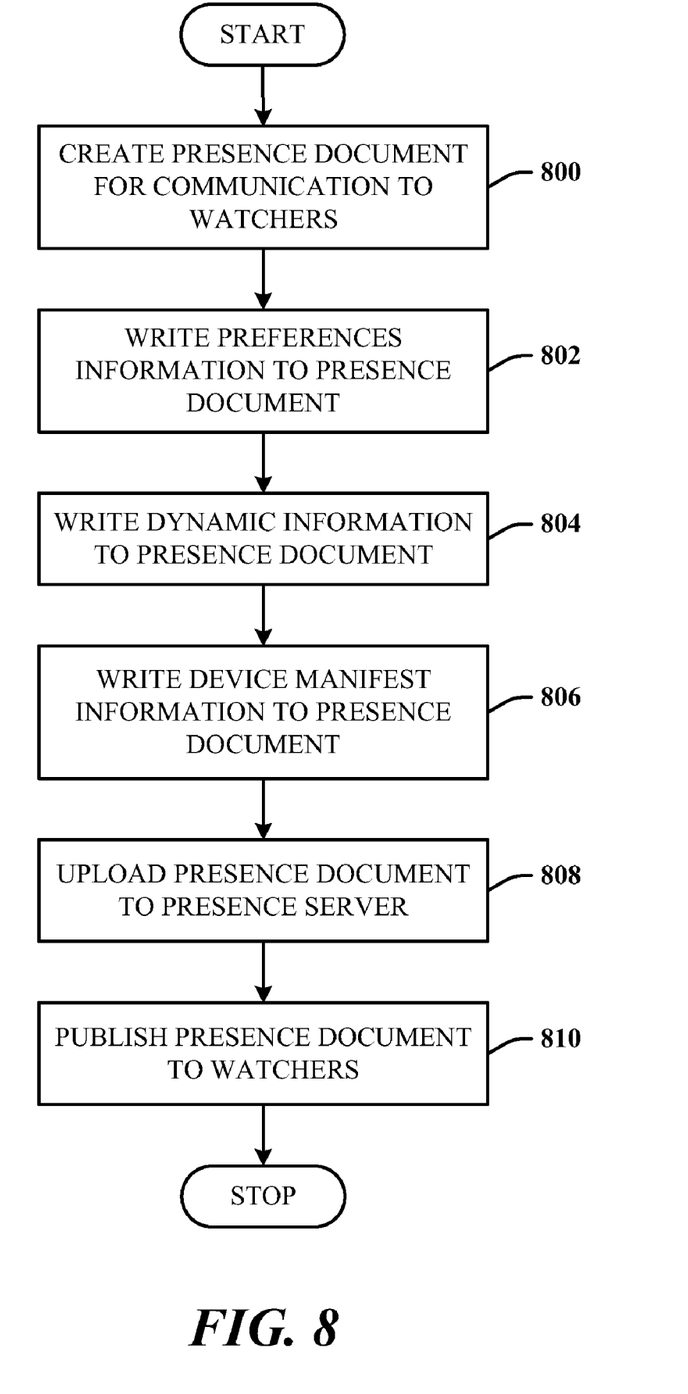
FIG. 8 illustrates a method of employing preferences information in a presence document.

FIG. 8 illustrates a method of employing preferences information in a presence document. At 800, a presence document is created for communications to watchers. At 802, preferences information is written to the presence document. At 804, dynamic information is written to the presence document. At 806, device manifest information is written to the presence document. At 808, the presence document is uploaded to a presence server. At 810, the presence document is published to watchers.

Figure 9:
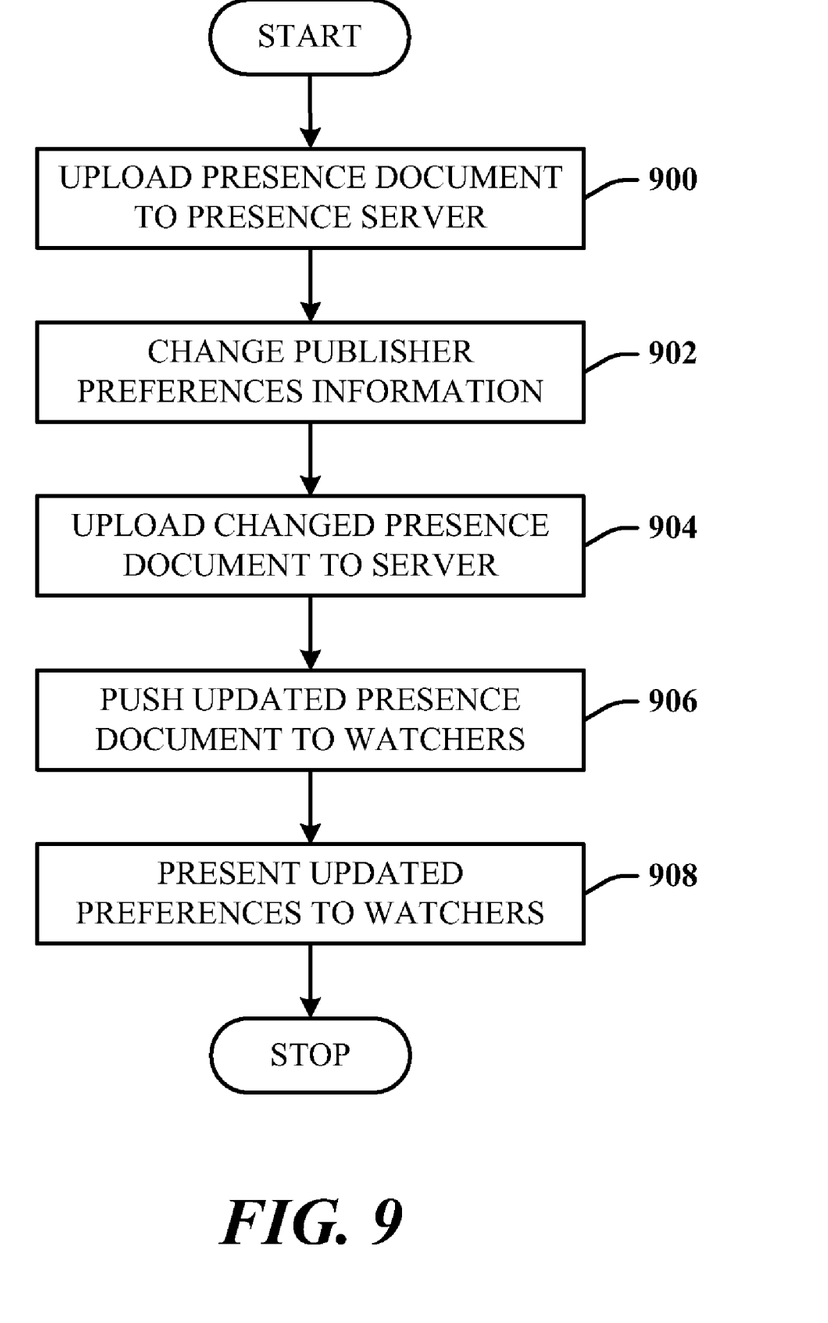
FIG. 9 illustrates a method of updating a presence document according to changes in preferences.

FIG. 9 illustrates a method of updating a presence document according to changes in preferences. At 900, a presence document is uploaded to a presence server. At 902, publisher preferences are changed. At 904, the changed presence document is uploaded to the presence server. At 906, the updated presence document is pushed to the watchers. At 908, the updated preferences information is presented to the watchers.

While certain ways of displaying information to users are shown and described with respect to certain figures as screenshots, those skilled in the relevant art will recognize that various other alternatives can be employed. The terms "screen," "screenshot", "webpage," "document", and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 10:
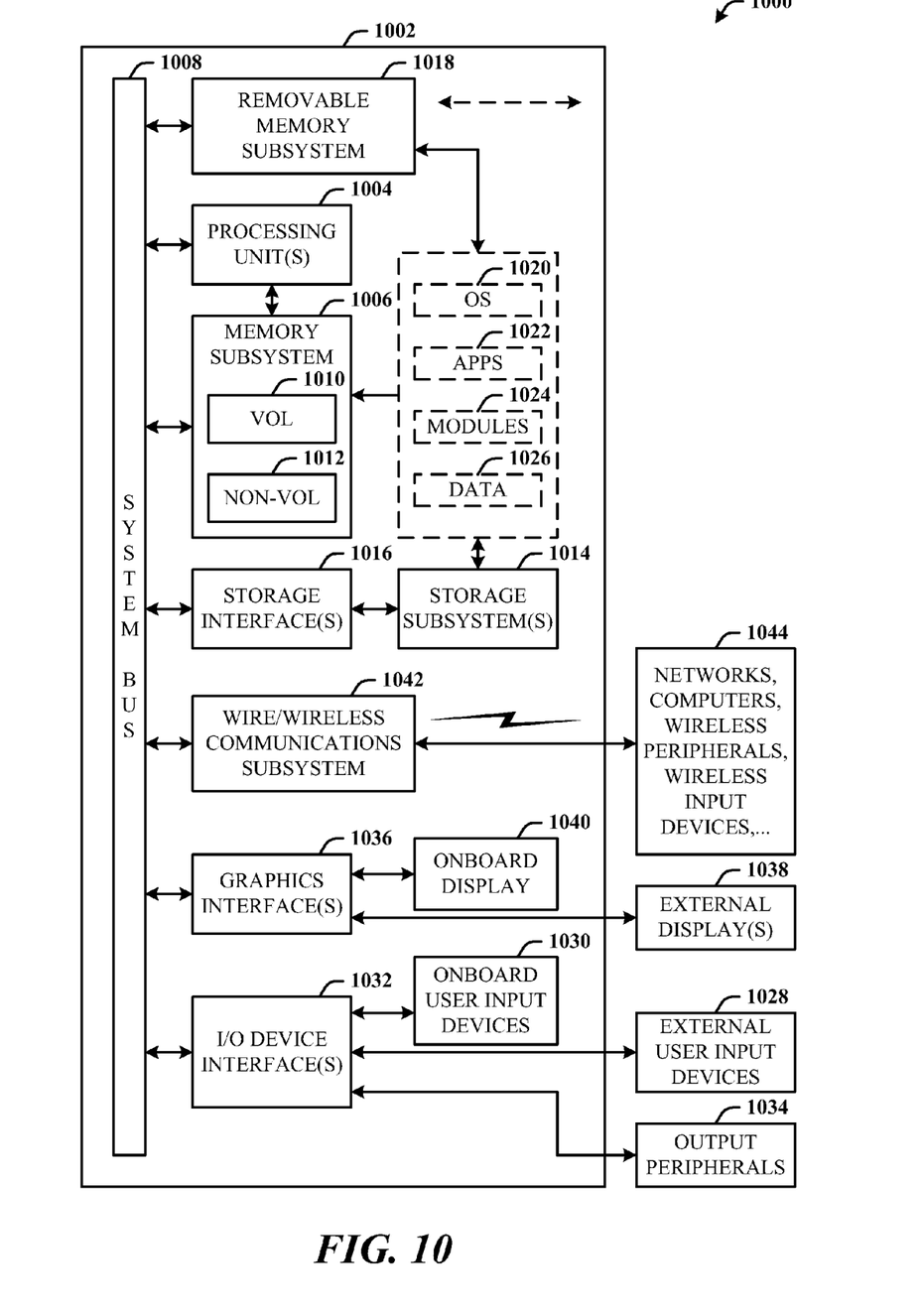
FIG. 10 illustrates a block diagram of a computing system operable to execute presence documents with preferences information in accordance with the disclosed architecture.

Referring now to FIG. 10, there is illustrated a block diagram of a computing system 1000 operable to execute presence documents with preferences information in accordance with the disclosed architecture. In order to provide additional context for various aspects thereof, FIG. 10 and the following discussion are intended to provide a brief, general description of the suitable computing system 1000 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1000 for implementing various aspects includes the computer 1002 having processing unit(s) 1004, a system memory 1006, and a system bus 1008. The processing unit(s) 1004 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1006 can include volatile (VOL) memory 1010 (e.g., random access memory (RAM)) and non-volatile memory (NON-VOL) 1012 (e.g., ROM, EPROM, EEPROM, etc.). A basic input/output system (BIOS) can be stored in the non-volatile memory 1012, and includes the basic routines that facilitate the communication of data and signals between components within the computer 1002, such as during startup. The volatile memory 1010 can also include a high-speed RAM such as static RAM for caching data.

The system bus 1008 provides an interface for system components including, but not limited to, the memory subsystem 1006 to the processing unit(s) 1004. The system bus 1008 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1002 further includes storage subsystem(s) 1014 and storage interface(s) 1016 for interfacing the storage subsystem(s) 1014 to the system bus 1008 and other desired computer components. The storage subsystem(s) 1014 can include one or more of a hard disk drive (HDD), a magnetic floppy disk drive (FDD), and/or optical disk storage drive (e.g., a CD-ROM drive DVD drive), for example. The storage interface(s) 1016 can include interface technologies such as EIDE, ATA, SATA, and IEEE 1394, for example.

One or more programs and data can be stored in the memory subsystem 1006, a removable memory subsystem 1018 (e.g., flash drive form factor technology), and/or the storage subsystem(s) 1014, including an operating system 1020, one or more application programs 1022, other program modules 1024, and program data 1026. Generally, programs include routines, methods, data structures, other software components, etc., that perform particular tasks or implement particular abstract data types. Where the computer 1002 is a client machine, the one or more application programs 1022, other program modules 1024, and program data 1026 can include the capabilities information 104, the local user 106, the capabilities document 108, the capabilities component 102 of FIG. 1, the UI 202 and preferred modality(ies) 204 of FIG. 2, the publisher 304, publisher document 302, user preferences 306, dynamic information 308, and device manifest 310 of FIG. 3, the security component 402 of FIG. 4, the UI 500 of FIG. 5, the UI 600 of FIG. 6, and one or more of the FIGS. 7-9, for example.

All or portions of the operating system 1020, applications 1022, modules 1024, and/or data 1026 can also be cached in memory such as the volatile memory 1010, for example. It is to be appreciated that the disclosed architecture can be implemented with various commercially available operating systems or combinations of operating systems (e.g., as virtual machines).

The storage subsystem(s) 1014 and memory subsystems (1006 and 1018) serve as computer readable media for volatile and non-volatile storage of data, data structures, computer-executable instructions, and so forth. Computer readable media can be any available media that can be accessed by the computer 1002 and includes volatile and non-volatile media, removable and non-removable media. For the computer 1002, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 1002, programs, and data using external user input devices 1028 such as a keyboard and a mouse. Other external user input devices 1028 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1002, programs, and data using onboard user input devices 1030 such a touchpad, microphone, keyboard, etc., where the computer 1002 is a portable computer, for example. These and other input devices are connected to the processing unit(s) 1004 through input/output (I/O) device interface(s) 1032 via the system bus 1008, but can be connected by other interfaces such as a parallel port, IEEE 1394 serial port, a game port, a USB port, an IR interface, etc. The I/O device interface(s) 1032 also facilitate the use of output peripherals 1034 such as printers, audio devices, camera devices, and so on, such as a sound card and/or onboard audio processing capability.

One or more graphics interface(s) 1036 (also commonly referred to as a graphics processing unit (GPU)) provide graphics and video signals between the computer 1002 and external display(s) 1038 (e.g., LCD, plasma) and/or onboard displays 1040 (e.g., for portable computer). The graphics interface(s) 1036 can also be manufactured as part of the computer system board.

The computer 1002 can operate in a networked environment (e.g., IP) using logical connections via a wired/wireless communications subsystem 1042 to one or more networks and/or other computers. The other computers can include workstations, servers, routers, personal computers, microprocessor-based entertainment appliance, a peer device or other common network node, and typically include many or all of the elements described relative to the computer 1002. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1002 connects to the network via a wired/wireless communication subsystem 1042 (e.g., a network interface adapter, onboard transceiver subsystem, etc.) to communicate with wired/wireless networks, wired/wireless printers, wired/wireless input devices 1044, and so on. The computer 1002 can include a modem or has other means for establishing communications over the network. In a networked environment, programs and data relative to the computer 1002 can be stored in the remote memory/storage device, as is associated with a distributed system. It will be appreciated that the network connections shown are exemplary and other means of establishing a communications link between the computers can be used.

The computer 1002 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 11:
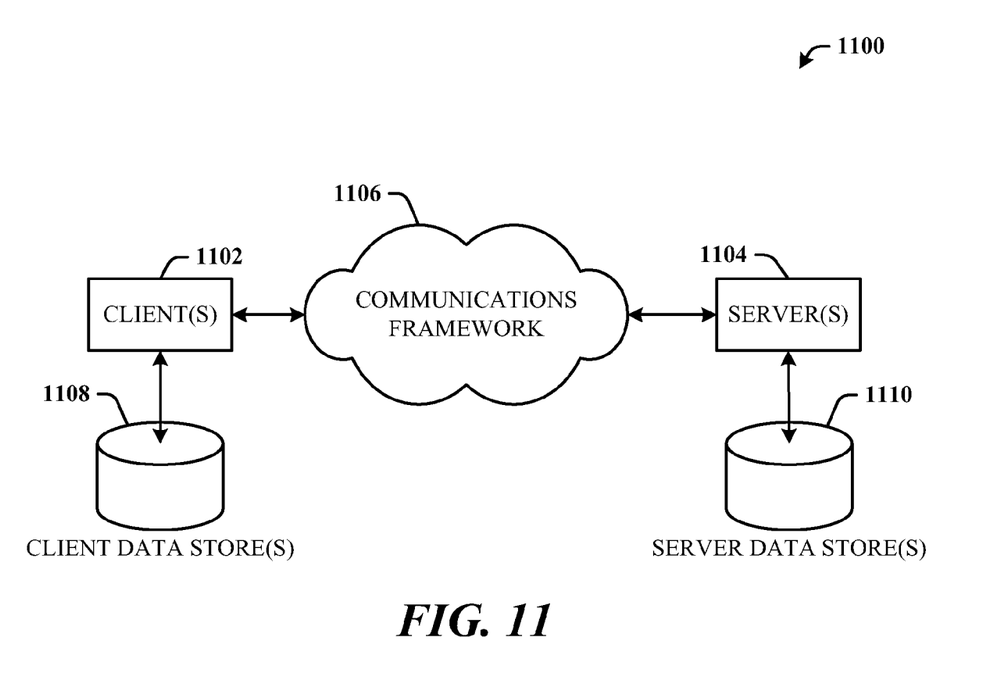
FIG. 11 illustrates a schematic block diagram of a computing environment that supports preferences processing in accordance with the disclosed architecture.

Referring now to FIG. 11, there is illustrated a schematic block diagram of a computing environment 1100 that supports preferences processing in accordance with the disclosed architecture. The environment 1100 includes one or more client(s) 1102. The client(s) 1102 can be hardware and/or software (e.g., threads, processes, computing devices). The client(s) 1102 can house cookie(s) and/or associated contextual information, for example.

The environment 1100 also includes one or more server(s) 1104. The server(s) 1104 can also be hardware and/or software (e.g., threads, processes, computing devices). The servers 1104 can house threads to perform transformations by employing the architecture, for example. One possible communication between a client 1102 and a server 1104 can be in the form of a data packet adapted to be transmitted between two or more computer processes. The data packet may include a cookie and/or associated contextual information, for example. The environment 1100 includes a communication framework 1106 (e.g., a global communication network such as the Internet) that can be employed to facilitate communications between the client(s) 1102 and the server(s) 1104.

Communications can be facilitated via a wire (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented capabilities communication system, the system comprising:
    a processor; and
    a capabilities component executed by the processor for aggregating capabilities information associated with a local user of the system as part of a capabilities document and for uploading the capabilities document to a presence server that is accessible by a remote user, wherein:
        the capabilities component automatically computes hardware capabilities and software capabilities based on a device manifest associated with a device of the local user,
        the capabilities document, when presented to the remote user, indicates a preferred realtime communications modality that the local user desires to use to communicate with the remote user,
        the capabilities document includes modality information related to a plurality of independent realtime communications modalities,
        the modality information conveys an ability or inability of the local user to use each of the plurality of independent realtime communications modalities,
        the capabilities document includes preferences information related to each independent realtime communications modality that the local user is able to use, and
        the preferred realtime communications modality is based on the modality information and the preferences information included in the capabilities document.

2. The system of claim 1, wherein the capabilities information includes hardware capabilities and software capabilities related to at least one mobile device of the local user.

3. The system of claim 1, wherein the capabilities document conveys capabilities information related to collaboration modalities including application sharing and file sharing.

4. The system of claim 1, wherein the capabilities component automatically computes software capabilities based on legacy software associated with the device of the local user which prohibits utilization of one or more communications modalities.

5. The system of claim 1, wherein the capabilities component dynamically computes spatial information, temporal information, and environmental information associated with the local user.

6. The system of claim 1, wherein the preferences information is based on at least one of scheduling data of the local user, location of the local user, or identity of the remote user.

7. The system of claim 1, wherein all or portions of the capabilities document are presented to the remote user based on permissions of the remote user.

8. The system of claim 1, wherein different preferred realtime communications modalities are indicated to the remote user based on at least one of scheduling data of the local user and location of the local user.

9. A computer-implemented capabilities communication system, comprising:
- a server database for storing presence modality capabilities information of a device of a publisher as part of a presence document; and
- a presence server for communicating the presence document to a watcher, wherein:
  - the presence modality capabilities information includes hardware capabilities and software capabilities automatically computed based on a device manifest for the device of the publisher,
  - the presence document, when presented to the watcher, indicates a preferred realtime communications modality associated with the device that the publisher desires to use to communicate with the watcher,
  - the presence document includes presence modality capabilities information related to a plurality of independent realtime communications modalities,
  - the presence modality capabilities information conveys an ability or inability of the publisher to use each of the plurality of independent realtime communications modalities,
  - the presence document includes preferences information related to each independent realtime communications modality that the publisher is able to use, and
  - the preferred realtime communications modality associated with the device is based on the presence modality capabilities information and the preferences information included in the presence document.

10. The system of claim 9, wherein the presence document includes geographic information, temporal information, and environment information associated with the publisher.

11. The system of claim 9, wherein the preferences information is based on at least one of scheduling data of the publisher, location of the publisher, or identity of the watcher.

12. The system of claim 9, wherein different preferred realtime communications modalities are indicated to the watcher based on at least one of scheduling data of the publisher and location of the publisher.

13. The system of claim 9, wherein the presence document includes:
- user preferences of the publisher for one or more realtime communications modalities of the device of the publisher,
- dynamic information based on a location of the publisher, and
- the presence modality capabilities information based on the device manifest for the device of the publisher.

14. A computer-implemented method of communicating capabilities, comprising:
- receiving modality capabilities information of a device of a publisher;
- storing the modality capabilities information of the device of the publisher as part of a presence document; and
- communicating the presence document to a watcher, wherein:
  - the modality capabilities information includes hardware capabilities and software capabilities automatically computed based on a device manifest for the device of the publisher,
  - the presence document, when presented to the watcher, indicates a preferred realtime communications modality that the publisher desires to use to communicate with the watcher,
  - the presence document includes modality capabilities information related to a plurality of independent realtime communications modalities,
  - the modality capabilities information conveys an ability or inability of the publisher to use each of the plurality of independent realtime communications modalities,
  - the presence document includes preferences information related to each independent realtime communications modality that the publisher is able to use, and
  - the preferred realtime communications modality is based on the modality capabilities information and the preferences information included in the presence document.

15. The method of claim 14, further comprising:
receiving dynamically updated modality capabilities information based on changes in state of the publisher; and
sending the updated modality capabilities information in an updated presence document to the watcher.

16. The method of claim 14, further comprising including preferences information of the publisher in the modality capabilities information as to one or more asynchronous communications modalities.

17. The method of claim 16, further comprising stipulating the one or more asynchronous communications modalities as a preference of the publisher based on at least one of physical location of the publisher, scheduling state of the publisher, or identity of the watcher.

18. The method of claim 14, wherein the presence document indicates a capability of a specific realtime communications modality as positive when the publisher is able and willing to communicate using the specific realtime communications modality and negative when the publisher is unable or unwilling to communicate using the specific realtime communications modality.

19. The method of claim 14, further comprising stipulating a realtime communications modality preference based on location of the publisher.

20. The method of claim 14, wherein different preferred realtime communications modalities are indicated to the watcher based on at least one of scheduling data of the publisher and location of the publisher.

* * * * *